United States Patent [19]
Yabuta et al.

[11] Patent Number: 5,889,115
[45] Date of Patent: Mar. 30, 1999

[54] CURABLE COATING COMPOSITION AND METHOD OF FORMING A TOP COAT

[75] Inventors: Motoshi Yabuta, Hadano; Masaaki Saika, Hiratsuka; Yasushi Nakao, Obu; Hiroshi Igarashi, Yokohama; Satoshi Ikushima, Hiratsuka, all of Japan

[73] Assignee: Kansai Paint Company Ltd, Hyogo-ken, Japan

[21] Appl. No.: 595,397

[22] Filed: Feb. 1, 1996

[30] Foreign Application Priority Data

Feb. 20, 1995 [JP] Japan .................................... 7-030696

[51] Int. Cl.$^6$ ...................................................... C08L 37/00
[52] U.S. Cl. ............................ 525/208; 525/209; 525/288
[58] Field of Search ..................................... 525/100, 209, 525/288, 208

[56] References Cited

U.S. PATENT DOCUMENTS 5,198,503   3/1993   Numa et al. ............................ 525/288

*Primary Examiner*—Mark L. Warzel
*Attorney, Agent, or Firm*—Armstrong, Westerman, Hattori, McLeland & Naughton

[57] ABSTRACT

The invention provides a curable coating composition comprising:
(a) a vinyl polymer having, in one molecule, (i) a group formed by half esterification of an acid anhydride group and (ii) a primary hydroxyl group,
(b) a vinyl polymer having an epoxy group and a primary hydroxyl group in one molecule, and
(c) a vinyl polymer having an ethoxysilyl group and a secondary hydroxyl group in one molecule, and a method of forming a top coat using said composition.

10 Claims, No Drawings

CURABLE COATING COMPOSITION AND METHOD OF FORMING A TOP COAT

The present invention relates to a novel curable coating composition and a method of forming a top coat using the coating composition.

Heat-curable top coat compositions comprising a hydroxyl-containing acrylic resin and a melamine resin have been heretofore chiefly used for coating automotive exterior panels. However, in recent years, acid rain has posed a world wide problem of etching and blots or like stains. With the increasing spread of car washers, scratches created on automobiles by car washers have presented another problem. In this situation, there is a need for top coat compositions, particularly clear top coat compositions, which are capable of forming coating films satisfactory in acid resistance and scratch resistance.

Usually scratch resistance is imparted to a coating film by increasing the crosslinking density of the film. On the other hand, a coating film can be made acid-resistant by incorporating an acid-resistant crosslinking system into the film. However, a method has been scarcely proposed for giving both acid resistance and scratch resistance to a coating film.

For example, Japanese Unexamined Patent Publication No.222,753/1990 discloses that a coating film having high crosslinking density and high scratch resistance can be obtained by baking an acrylic resin of high hydroxyl value in the presence of a monomeric melamine resin and an acid catalyst. Yet, this crosslinking system has a drawback of having a poor acid resistance since the crosslinked coating film containing a melamine resin readily decomposes when mixed with an acid.

Methods have been proposed for imparting both acid resistance and scratch resistance to a coating film using a less acid-resistant melamine resin crosslinking system in combination with an acid-resistant crosslinking system. For example, the proposed systems include a composite crosslinking system having a combination of carboxyl group/epoxy group/hydroxyl group/melamine resin (Japanese Unexamined Patent Publication No.247,264/1990), a composite crosslinking system having a combination of hydroxyl group/alkoxysilyl group/melamine resin (Japanese Unexamined Patent Publication No.816,383/1992), etc. However, these systems have not invariably achieved satisfactory improvements in acid resistance because of the presence of a melamine resin.

On the other hand, melamine resin-free crosslinking systems have been proposed. The proposals include a crosslinking system having a combination of carboxyl group/epoxy group or carboxyl group/epoxy group/hydroxyl group alone (e.g. Japanese Unexamined Patent Publications Nos.87,288/1987, 45,577/1990 and 287,650/1991). Yet, these systems have a shortcoming of giving coating films which are superior in acid resistance but inferior in scratch resistance owing to the low crosslinking density of cured film.

A resin composition comprising a carboxyl-containing vinyl polymer and an epoxy- and hydrolyzable silyl group-containing compound is known as a crosslinking system having a combination of carboxyl group/epoxy group/hydrolyzable silyl group (Japanese Unexamined Patent Publication No.187,749/1987) but has a defect of an unsatisfactory curing reaction occurring between the polymer and the compound because of the steric hindrance caused by the presence of epoxy group and hydrolyzable silyl group in the same molecule.

A resin composition comprising a hydroxyl- and carboxyl-containing silicone polymer, a carboxyl- and carboxylic acid ester group-containing polymer and a hydroxyl- and epoxy-containing polymer has been proposed as a crosslinking system having a combination of carboxyl group/epoxy group/hydroxyl group which contains the silicone polymer as a base resin (Japanese Unexamined Patent Publication No.166,741/1994). The cured coating of this composition is defective in that it is not always fully satisfactory in crosslinking density and is poor in the recoat adhesion which is one of important characteristics of coating compositions for automotive exterior panels.

An object of the present invention is to provide a novel curable coating composition free of the foregoing prior art drawbacks, and a method of forming a top coat using said composition.

Another object of the invention is to provide a novel curable coating composition which is capable of producing a coating film excellent in both of acid resistance and scratch resistance, and a method of forming a top coat using said composition.

A further object of the invention is to provide a novel curable coating composition excellent in low temperature curability, storage stability and recoat adhesion, and a method of forming a top coat using said composition.

These and other objects of the invention will become apparent from the following description.

According to the present invention, there is provided a curable coating composition comprising:

(a) a vinyl polymer having, in one molecule, (i) a group formed by half esterification of an acid anhydride group and (ii) a primary hydroxyl group, (b) a vinyl polymer having an epoxy group and a primary hydroxyl group in one molecule, and (c) a vinyl polymer having an ethoxysilyl group and a secondary hydroxyl group in one molecule.

The present invention also provides a method of forming a top coat, the method comprising the steps of coating a substrate with a colored base coat composition and coating the base coat with a clear top coat composition, the method being characterized in that at least one of the colored base coat composition and the clear top coat composition contains the above-mentioned curable composition as a resin component.

The inventors of the present invention conducted extensive research to achieve the above objects and found that the objects can be achieved by the curable coating composition comprising the above-specified polymers (a), (b) and (c). The present invention has been completed based on this novel finding.

The components of the curable coating composition according to the invention will be specifically described below.

The polymer (a) for use in the invention is a vinyl polymer having, in one molecule, (i) a group formed by half esterification of an acid anhydride group and (ii) a primary hydroxyl group.

The group formed by half esterification of an acid anhydride group is a group comprising a carboxyl group and a carboxylic acid ester group, the group being obtained by reacting an acid anhydride group with an aliphatic monohydric alcohol for ring opening, namely by half-esterification. Hereinafter the group may be referred to simply as "half ester group".

Such half ester group can regenerate an acid anhydride group by a reaction for the removal of an alcohol at an elevated temperature of about 100° C. The regenerated acid anhydride group is reacted with a primary hydroxyl group to form a carboxyl group. Then the carboxyl group is reacted with an epoxy group. This mechanism contributes to imparting low temperature curability to the composition of the invention.

The polymer (a) can be easily prepared by copolymerizing a vinyl monomer having a half ester group, a vinyl monomer having a primary hydroxyl group and other vinyl monomers in the conventional manner, or by the same copolymerization with the exception of using a vinyl monomer having an acid anhydride group in place of the vinyl monomer having a half ester group, followed by half-esterification of the acid anhydride group.

Useful vinyl monomers having an acid anhydride group are, for example, a maleic anhydride, an itaconic anhydride or the like. Useful vinyl monomers having a half ester group are, for example, those prepared by half-esterification of the acid anhydride group of the acid anhydride group-containing vinyl monomer.

The half-esterification can be done either before or after copolymerization reaction, as described above. Examples of aliphatic monohydric alcohols useful in half-esterification are low-molecular-weight monohydric alcohols such as methanol, ethanol, isopropanol, t-butanol, isobutanol, methyl cellosolve, ethyl cellosolve, etc. The half-esterification reaction is conducted in the conventional manner at a temperature ranging from room temperature to about 80° C., if necessary in the presence of tertiary amine serving as a catalyst.

Examples of useful vinyl monomers having a primary hydroxyl group are $C_{2-8}$ hydroxyalkyl esters of acrylic or methacrylic acids, such as 2-hydroxyethyl (meth)acrylate, 3-hydroxypropyl (meth)acrylate, hydroxybutyl (meth) acrylate, etc.; monoesters of (meth)acrylic acid or like unsaturated carboxylic acids with polyethylene glycol, polypropylene glycol, polybutylene glycol or like polyether polyols; monoethers of 2-hydroxyethyl (meth)acrylate or like hydroxyl-containing unsaturated monomers with polyethylene glycol, polypropylene glycol, polybutylene glycol or like polyether polyols; mono-esterification products or di-esterification products of maleic anhydride, itaconic anhydride or like acid anhydride group-containing unsaturated compounds with ethylene glycol, 1,6-hexanediol, neopentyl glycol or like glycols, etc.; hydroxyethyl vinyl ether or like hydroxyalkyl vinyl ethers, etc.; and allyl alcohols, etc.

Examples of said other vinyl monomers are (meth)acrylic acid esters; vinyl ethers and aryl ethers; olefin compounds and diene compounds; hydrocarbon ring-containing unsaturated monomers; and nitrogen-containing unsaturated monomers; etc.

Examples of (meth)acrylic acid esters are $C_{1-24}$ alkyl esters or cycloalkyl esters of acrylic or methacrylic acids, such as methyl acrylate, ethyl acrylate, n-propyl acrylate, isopropyl acrylate, n-butyl acrylate, isobutyl acrylate, t-butyl acrylate, hexyl acrylate, 2-ethylhexyl acrylate, n-octyl acrylate, decyl acrylate, stearyl acrylate, lauryl acrylate, cyclohexyl acrylate, methyl methacrylate, ethyl methacrylate, n-propyl methacrylate, isopropyl methacrylate, n-butyl methacrylate, isobutyl methacrylate, t-butyl methacrylate, hexyl methacrylate, 2-ethylhexyl methacrylate, octyl methacrylate, decyl methacrylate, lauryl methacrylate, stearyl methacrylate, cyclohexyl methacrylate, etc.; and $C_{2-18}$ alkoxyalkyl esters of acrylic or methacrylic acids, such as methoxybutyl acrylate, methoxybutyl methacrylate, methoxyethyl acrylate, methoxyethyl methacrylate, ethoxybutyl acrylate, ethoxybutyl methacrylate, etc.

Examples of vinyl ethers and aryl ethers are ethyl vinyl ether, n-propyl vinyl ether, isopropyl vinyl ether, butyl vinyl ether, t-butyl vinyl ether, pentyl vinyl ether, hexyl vinyl ether, octyl vinyl ether and like chain-like alkyl vinyl ethers; cyclopentyl vinyl ether, cyclohexyl vinyl ether and like cycloalkyl vinyl ethers; phenyl vinyl ether and like aryl vinyl ethers; benzyl vinyl ether, phenethyl vinyl ether and like aralkyl vinyl ethers; and allyl glycidyl ether, allyl ethyl ether and like allyl ethers; etc.

Examples of olefin compounds and diene compounds are ethylene, propylene, butylene, vinyl chloride, butadiene, isoprene, chloroprene, etc.

Examples of hydrocarbon ring-containing unsaturated monomers are styrene, α-methylstyrene, phenyl (meth) acrylate, phenylethyl (meth)acrylate, phenylpropyl (meth) acrylate, benzyl (meth)acrylate, phenoxyethyl (meth) acrylate, cyclohexyl (meth)acrylate, 2-acryloyloxyethylhydrogen phthalate, 2-acryloyloxypropylhydrogen phthalate, 2-acryloyloxypropylhexahydrohydrogen phthalate, 2-acryloyloxypropyltetrahydrohydrogen phthalate, ester of p-t-butyl-benzoic acid with hydroxyethyl (meth)acrylate, dicyclopentenyl (meth)acrylate, etc.

Examples of nitrogen-containing unsaturated monomers are nitrogen-containing alkyl (meth)acrylates such as N,N-dimethylaminoethyl (meth)acrylate, N,N-diethylaminoethyl (meth)acrylate, N-t-butylaminoethyl (meth)acrylate, etc.; polymerizable amides such as acrylamide, methacrylamide, N-methyl (meth)acrylamide, N-ethyl (meth)acrylamide, N,N-dimethyl (meth)acrylamide, N,N-dimethylaminopropyl (meth)acrylamide, N,N-dimethylaminoethyl (meth)acrylamide, etc.; aromatic nitrogen-containing monomers such as 2-vinylpyridine, 1-vinyl-2-pyrrolidone, 4-vinylpyridine, etc.; polymerizable nitriles such as (meth)acrylonitriles; allylamines; and so on.

The copolymerization can be carried out by conventional methods for copolymerization of vinyl monomers. The most suitable methods are methods of organic solvent solution type radical polymerization in view of extended applications and costs. Stated more specifically, the desired polymer can be easily obtained by copolymerization at a temperature of about 60 to about 150° C. in an organic solvent in the presence of a polymerization initiator such as azobisisobutyronitrile, benzoyl peroxide or the like. Useful organic solvents include aromatic hydrocarbons such as xylene and toluene, ketones such as methyl ethyl ketone and methyl isobutyl ketone, esters such as ethyl acetate, butyl acetate, isobutyl acetate and 3-methoxybutyl acetate, and alcohols such as n-butanol and isopropyl alcohol, etc.

The half ester group- or acid anhydride group-containing vinyl monomer, primary hydroxyl-containing vinyl monomer and other vinyl monomer are copolymerized in the following proportions based on the total monomers. The proportion of the half ester group- or acid anhydride group-containing vinyl monomer is about 10 to about 30% by weight, preferably about 15 to about 25% by weight, in view of curability and storage stability. The proportion of the primary hydroxyl-containing vinyl monomer is about 5 to about 30% by weight, preferably about 5 to about 25% by weight, in view of curability and storage stability. The proportion of the other vinyl monomer is about 40 to about 85% by weight, preferably about 50 to about 70% by weight. Of the other vinyl monomers, styrene is used suitably in a proportion of up to about 20% by weight in view of weatherability of cured coating. When an acid anhydride group-containing vinyl monomer is used, half-esterification is effected as described above after copolymerization.

The polymer (a) prepared by the copolymerization of the monomers in said proportion range has an acid value of 50 to 240 mg KOH/g, preferably 80 to 120 mg KOH/g, and a hydroxyl value of 5 to 150 mg KOH/g, preferably 5 to 100 mg KOH/g.

An acid value of less than 50 mg KOH/g in the polymer (a) is likely to lower the curability of the resulting composition and to thereby reduce the acid resistance and scratch resistance of the coating film, whereas an acid value of more than 240 mg KOH/g in the polymer (a) tends to decrease the compatibility with the polymers (b) and (c) and to thereby reduce the storage stability of the composition. Hence an acid value of the polymer (a) outside said range is undesirable.

A hydroxyl value of less than 5 mg KOH/g in the polymer (a) is likely to lower the curability of the resulting composition and to thereby reduce the acid resistance and scratch resistance of the coating film, whereas a hydroxyl value of more than 150 mg KOH/g in the polymer (a) tends to decrease the water resistance of the film. Hence a hydroxyl value of the polymer (a) outside said range is undesirable.

Preferably the polymer (a) is an acrylic polymer having a number average molecular weight of 2,000 to 8,000. A number average molecular weight of less than 2,000 tends to impair the weatherability of the cured coating, whereas a number average molecular weight exceeding 8,000 tends to reduce the compatibility with the polymers (b) and (c). Hence a number average molecular weight of the polymer (a) outside said range is undesirable.

The polymer (b) for use herein is a vinyl polymer containing an epoxy group and a primary hydroxyl group in one molecule.

The polymer (b) can be easily prepared by the copolymerization of an epoxy-containing vinyl monomer, a primary hydroxyl-containing vinyl monomer and other vinyl monomer by the same conventional method as in the preparation of the polymer (a).

Useful epoxy-containing vinyl monomers are, for example, glycidyl (meth)acrylate, allyl glycidyl ether and the like. Examples of the primary hydroxyl-containing vinyl monomers and other vinyl monomer include the above-exemplified monomers.

For copolymerization, it is suitable to use the epoxy-containing vinyl monomer, primary hydroxyl-containing vinyl monomer and other vinyl monomer in the following proportions based on the total monomers. The proportion of the epoxy-containing vinyl monomer is about 25 to about 50% by weight, preferably about 30 to about 40% by weight, in view of curability and storage stability. The proportion of the primary hydroxyl-containing vinyl monomer is about 5 to about 30% by weight, preferably about 5 to about 20% by weight, in view of curability and storage stability. The proportion of the other vinyl monomer is about 20 to about 70% by weight, preferably about 40 to about 60% by weight. Of the other vinyl monomers, suitably styrene is used in a proportion of up to about 20% by weight in view of weatherability of cured coating.

The polymer (b) prepared by the copolymerization of the monomers in said proportion range has an epoxy content of 0.8 to 3.2 mmol/g, preferably 1.2 to 2.8 mmol/g and a hydroxyl value of 5 to 150 mg KOH/g, preferably 5 to 100 mg KOH/g.

An epoxy content of less than 0.8 mmol/g in the polymer (b) is likely to lower the curability of the resulting composition and to thereby reduce the acid resistance and scratch resistance of the coating film, whereas an epoxy content of more than 3.2 mmol/g in the polymer (b) tends to decrease the compatibility with the polymers (a) and (c) and to thereby reduce the storage stability of the composition. Hence an epoxy content of the polymer (b) outside said range is undesirable.

A hydroxyl value of less than 5 mg KOH/g in the polymer (b) is likely to lower the curability of the resulting composition and to thereby reduce the acid resistance and scratch resistance of the coating film, whereas a hydroxyl value of more than 150 mg KOH/g in the polymer (b) tends to decrease the water resistance of the film. Hence a hydroxyl value of the polymer (b) outside said range is undesirable.

Preferably the polymer (b) is an acrylic polymer having a number average molecular weight of 2,000 to 15,000. A number average molecular weight of less than 2,000 tends to impair the weatherability of the cured coating, whereas a number average molecular weight exceeding 15,000 tends to reduce the compatibility with the polymers (a) and (c). Hence a number average molecular weight of the polymer (b) outside said range is undesirable.

A hydroxyl value in terms of a total of hydroxyl values in the polymers (a) and (b) based on the primary hydroxyl group is 10 to 150 mg KOH/g, preferably 50 to 100 mg KOH/g. A hydroxyl value of less than 10 mg KOH/g based on the primary hydroxyl value is likely to lower the curability of the resulting composition and to thereby reduce the acid resistance and scratch resistance of the coating film, whereas a hydroxyl value of more than 150 mg KOH/g based on the primary hydroxyl group tends to decrease the water resistance of the film. Hence a hydroxyl value based on the primary hydroxyl group outside said range is undesirable.

The polymer (c) for use herein is a vinyl polymer containing an ethoxysilyl group and a secondary hydroxyl group in one molecule.

In the composition of the invention, the polymer (c) has both a hydrolyzable ethoxysilyl group and a secondary hydroxyl group in one molecule, and thereby achieves remarkable results, namely enhances both the acid resistance and scratch resistance of coating film and improves the low temperature curability, storage stability and recoat adhesion of the composition. If the polymer (c) should have a methoxysilyl group in place of ethoxysilyl group, the storage stability of the composition would be markedly decreased. If the polymer (c) should be free of a secondary hydroxyl group, the recoat adhesion would be pronouncedly reduced. Therefore, in either case, the objects of the invention can not be achieved.

The polymer (c) can be easily prepared by the copolymerization of an ethoxysilyl group-containing vinyl monomer, a secondary hydroxyl-containing vinyl monomer and other vinyl monomer by the same conventional method as in the preparation of the polymer (a).

Examples of vinyl monomers having an ethoxysilyl group are vinyl triethoxysilane, γ-methacryloxypropyl triethoxysilane, etc.

Examples of vinyl monomers having a secondary hydroxyl group are 2-hydroxypropyl (meth)acrylate; an addition reaction product of α,β-unsaturated carboxylic acid with a monoepoxy compound such as Cardula E10 (trademark, product of Shell Petrochemical Co., Ltd.), α-olefin epoxide or the like; and an addition reaction product of glycidyl (meth)acrylate with a monobasic acid such as acetic acid, propionic acid or p-t-butylbenzoic acid, aliphatic acid or the like.

The other vinyl monomers useful in the preparation of the polymer (c) include those exemplified above.

For copolymerization, it is suitable to use the ethoxysilyl group-containing vinyl monomer, secondary hydroxyl-containing vinyl monomer and other vinyl monomer in the following proportion based on the total monomers. The proportion of the ethoxysilyl group-containing vinyl monomer is about 20 to about 60% by weight, preferably about 20 to about 50% by weight, in view of curability and costs. The proportion of the secondary hydroxyl-containing vinyl monomer is about 5 to about 50% by weight, preferably about 10 to about 40% by weight, in view of recoat adhesion and water resistance. The proportion of the other vinyl monomer is about 10 to about 75% by weight, preferably about 40 to about 60% by weight. Of the other vinyl monomers, styrene is used in a proportion of up to about 20% by weight in view of weatherability of cured coating.

The polymer (c) prepared by the copolymerization of these monomers in said proportion ranges has a hydroxyl value (based on the secondary hydroxyl group) of 10 to 250 mg KOH/g, preferably 50 to 150 mg KOH/g.

A hydroxyl value of less than 10 mg KOH/g in the polymer (c) is likely to impair the recoat adhesion of the resulting composition, whereas a hydroxyl value of more than 250 mg KOH/g in the polymer (c) tends to decrease the water resistance of the film. Hence a hydroxyl value of the polymer (c) outside said range is undesirable.

Preferably the polymer (c) is an acrylic polymer having a number average molecular weight of 2,000 to 15,000. A number average molecular weight of less than 2,000 tends to impair the weatherability of the cured coating film, whereas a number average molecular weight exceeding 15,000 tends to reduce the compatibility with the polymers (a) and (b). Hence a number average molecular weight of the polymer (c) outside said range is undesirable.

The polymers (a), (b) and (c) are used in the following proportions as the essential components of the curable composition of the invention. The proportions of the polymers (a) and (b) are such that an equivalent ratio of the carboxyl group in the polymer (a) to the epoxy group in the polymer (b) is from 1:0.5 to 0.5:1. The polymer (c) is used in a proportion of 25 to 65 parts by weight per 100 parts by weight of the combined amount of the polymers (a) and (b). The proportions of these polymers outside said range are likely to decrease the curability of the composition and the resistance to acids and scratch of the coating film and are hence undesirable. Preferably the proportions of the polymers (a) and (b) are such that an equivalent ratio of the carboxyl group in the polymer (a) to the epoxy group in the polymer (b) is from 1:0.6 to 0.6:1. The polymer (c) is used preferably in a proportion of 35 to 55 parts by weight per 100 parts by weight of the combined amount of the polymers (a) and (b).

Optionally the curable composition of the invention may contain a carboxyl-containing polyester polymer. In this case, the curability can be further increased due to the reaction of such polymer with the epoxy group in the polymer (b).

The number average molecular weight of the carboxyl-containing polyester polymer used herein is not specifically limited but usually in the range of about 1,500 to about 2,000.

The carboxyl-containing polyester polymer can be easily prepared by the condensation reaction of a polyhydric alcohol with a polycarboxylic acid. Useful polyhydric alcohols include, for example, ethylene glycol, butylene glycol, 1,6-hexanediol, trimethylolpropane, pentaerythritol, etc. Useful polycarboxylic acids include, for example, adipic acid, terephthalic acid, isophthalic acid, phthalic anhydride, hexahydrophthalic anhydride, etc. Stated more specifically, the carboxyl-containing polyester polymer can be prepared, for example, by a one-step reaction using a reaction system containing excess carboxyl group of a polycarboxylic acid or by a reaction using a reaction system containing excess hydroxyl group of a polyhydric alcohol to give a hydroxyl-terminated polyester polymer, followed by an addition reaction of the polymer with an acid anhydride group-containing compound such as phthalic anhydride, hexahydrophthalic anhydride, succinic anhydride, etc.

Preferably a hydroxyl group may be introduced into the carboxyl-containing polyester polymer to an extent of a hydroxyl value of up to 100 mg KOH/g to increase the compatibility with the polymers (a), (b) and (c) and to thereby make the polymer reactive with the ethoxysilyl group in the polymer (c). The introduction of a hydroxyl group can be effected by intermitting the condensation reaction in the presence of excess carboxyl group, or by the addition reaction of the hydroxyl-terminated polyester polymer prepared in the presence of excess hydroxyl group with an acid anhydride group-containing compound in an amount less than the hydroxyl group.

Optionally the curable composition of the invention may further contain a curing catalyst.

Useful curing catalysts include, for example, catalysts which effectively act in the crosslinking reaction of a carboxyl group with an epoxy group, such as tetraethylammonium bromide, tetrabutylammonium bromide, tetraethylammonium chloride, tetrabutylphosphonium bromide, triphenylbenzylphosphonium chloride and like quaternary salts; triethylamine, tributylamine and like amines; etc. Among them, quaternary salts are preferred. A combination of a quaternary salt and a phosphoric acid compound such as dibutyl phosphate in a substantially equivalent amount is desirable to use to increase the storage stability of the composition without impairing the curability and to prevent the reduction in the electrical resistance value of the coating composition, i.e. the decrease in the amenability to spray coating. Catalysts which are preferably used in the crosslinking reaction of ethoxysilyl group include dibutyltin dilaurate, dibutyltin diacetate and like tins, tetrabutyl titanate and like titaniums, triethylamine, tributylamine and like amines, etc.

These catalysts can be used either alone or in combination, but are preferably used in combination in view of curability, scratch resistance, etc.

Optionally the curable composition of the invention may contain a dehydrating agent such as trimethyl orthoacetate, etc. to prevent the composition from degradation of properties due to the water in the solvent used or in the air.

When required, the curable composition of the invention may contain conventional pigments including coloring pigments, extender pigments, anti-corrosive pigments, and so on.

Examples of useful coloring pigments are organic pigments such as quinacridone red and like quinacridone pigments, pigment red and like azo pigments, phthalocyanine blue, phthalocyanine green, perylene red and like phthalocyanine pigments, inorganic pigments such as titanium oxide and carbon black, metallic pigments such as aluminum flake, nickel flake, copper flake, brass flake, chrome flake, pearl mica and colored pearl mica.

Optionally the curable composition of the invention may contain resins such as polyester resins, alkyd resins, silicone resins, fluorine-containing resins, etc. and non-aqueous particulate polymers, and may also contain a minor amount of melamine resins, blocked isocyanate or like crosslinking agent. Further the curable composition of the invention may contain conventional additives for coating compositions such as UV absorbers, oxidation inhibitors, surface modifiers, defoaming agents, etc.

The curable composition of the invention is usually used in the form of an organic solvent composition. Examples of useful organic solvents include those for coating compositions such as aromatic or aliphatic hydrocarbons, alcohols, esters, ketones, ethers, etc. Organic solvents used in preparing the polymers as the components of the composition can be used for this purpose, or additional organic solvents may be used. The solid concentration of the composition is not critical and is usually in the range of about 20 to about 80% by weight, preferably about 30 to about 60% by weight.

The curable coating composition of the invention can be applied to various substrates by conventional coating methods and can be fully cured by heating at a temperature of about 100 to about 180° C. for about 10 to about 60 minutes to give a coating film having high resistance to acids and scratch.

The curing mechanism for curing the curable composition of the invention is presumably as follows. Crosslinking reactions occur first between the carboxyl group in the polymer (a) and the epoxy group in the polymer (b) and then between the hydrolyzable ethoxysilyl group in the polymer (c) and the primary hydroxyl groups in the polymers (a) and (b).

The method for forming a top coat according to the present invention comprises the steps of applying a colored base coat composition and a clear top coat composition in this order, using the curable composition of the invention as a resin component in the colored base coat composition and/or the clear top coat composition.

The substrates to be coated with a top coat include steel panels treated by chemical conversion, electrophoretically coated with a primer, and optionally coated with an intercoat; plastic substrates optionally surface-treated and optionally coated either with a primer or with a primer and an intercoat; substrates produced by a composite of steel and plastics, etc.

In the method of forming a top coat according to the invention, the curable composition of the invention is used as a resin component in at least one of a colored base coat composition and a clear top coat composition.

The curable composition of the invention is capable of forming a coating film excellent in resistance to acids and scratch and is, therefore, preferably used as a resin component in a clear top coat composition.

The curable composition of the invention can be used by itself as a clear top coat composition. The clear top coat composition may contain a coloring pigment in an amount which will not completely hide the colored base coat.

The curable composition of the invention can be used as a colored base coat composition by properly incorporating therein the foregoing coloring pigment selected from organic pigments, inorganic pigments, metallic pigments and the like.

The method of forming a top coat according to the invention is particularly suitable for forming a top coat on automotive exterior panels. The coating methods of the invention include those known in the automotive industry and include those comprising forming a colored base coat and a clear top coat by 2-coat 1-bake system or 2-coat 2-bake system, and those comprising forming a colored base coat, a clear top coat and a clear top coat in this order by 3-coat 1-bake system or 3-coat 2-bake system.

The most desirable method of forming a top coat according to the invention comprises applying a colored base coat composition to a substrate and a clear top coat composition to the base coat without curing the base coat, followed by curing the two coats by heating according to 2-coat 1-bake system.

Described below is the coating method by 2-coat 1-bake system using a clear top coat composition containing the curable composition of the invention as a resin component.

In 2-coat 1-bake system, first a colored base coat composition is applied to said substrate by conventional coating methods such as spray coating or the like.

The colored base coat composition to be applied may be of the type containing the curable composition of the invention as a resin component or may be of the type per se known and conventionally used in a method of forming a top coat.

Examples of colored base coat compositions per se known include, for example, those comprising a curable resin component and said coloring pigment. Useful curable resin components are, for example, acrylic resin/amino resin mixture, alkyd resin/amino resin mixture, polyester resin/amino resin mixture, acrylic resin/polyisocyanate mixture, alkyd resin/polyisocyanate mixture, polyester resin/polyisocyanate mixture, etc. The amino resins used in said mixtures include melamine resins. The form of these known colored base coat compositions is not specifically limited and can be a desirable type selected from organic solvent type, non-aqueous dispersion type, aqueous dispersion type, aqueous solution type, high solid type, etc.

Application devices for spray coating include an air spray gun, airless spray gun, air spray type electrostatic coater, airless spray type electrostatic coater, rotary atomization type electrostatic coater, etc.

The colored base coat composition is applied preferably to a thickness of about 10 to about 30 $\mu$m (when cured). The colored base coat thus deposited is left to stand at room temperature for a few minutes or is force-dried at a temperature of about 50 to about 80° C. for a few minutes and then the clear top coat composition containing the curable composition of the invention as a resin component is applied.

The clear top coat composition is applied by the same methods using the same coaters as used in the application of the colored base coat composition.

The clear top coat composition is applied preferably to a thickness of about 20 to about 80 $\mu$m (when cured).

Both the colored base coat and the clear top coat thus applied are concurrently cured by exposure to heat at about 100 to about 180° C. for about 10 to about 60 minutes.

The articles coated by the coating method of the invention have a coating film excellent in resistance to acids and scratch, and the coating film thus formed is particularly suitable for covering automotive exterior panels.

According to the invention, the following remarkable results can be accomplished. A coating film excellent in resistance to acids and scratch can be formed and there is provided a novel curable coating composition which is superior in low temperature curability, storage stability and recoat adhesion. Further provided is a method of forming a top coat using said composition.

The present invention is described below in more detail with reference to Preparation Examples, Comparative Preparation Examples, Examples and Comparative Examples wherein the parts and percentages are all by weight.

PREPARATION EXAMPLE 1

Preparation of a vinyl polymer having a half ester group and a primary hydroxyl group [polymer (a-1)]

A 5-liter glass flask equipped with a stirrer, thermometer and condenser was charged with 553 parts of xylene and 276 parts of 3-methoxybutyl acetate. The mixture was heated to 125° C. by an electrothermic mantle. At the same temperature, a mixture of the following composition was added dropwise uniformly over a period of 4 hours. p-Tert-butylperoxy-2-ethyl hexanoate is a polymerization initiator.

| Methanol half ester of maleic anhydride | 288 parts (20%) |
|---|---|
| 4-Hydroxy n-butyl acrylate | 288 parts (20%) |
| n-Butyl acrylate | 576 parts (40%) |
| Styrene | 288 parts (20%) |
| p-Tert-butylperoxy-2-ethyl hexanoate | 72 parts |

The mixture was aged for 30 minutes. Added dropwise was a mixture of 277 parts of 3-methoxybutyl acetate and 14.4 parts of p-tert-butylperoxy-2-ethyl hexanoate over a period of 2 hours. The mixture was aged for 2 hours, giving a solution of an acrylic polymer (hereinafter polymer (a-1)) having a final conversion of 98%.

The polymer solution had a polymer solid content of 55% and a Gardner viscosity (25° C.) of M. The obtained polymer had a number average molecular weight of 3,500, an acid value of 86 mg KOH/g and a hydroxyl value of 78 mg KOH/g.

PREPARATION EXAMPLE 2

Preparation of a vinyl polymer having a half ester group and a primary hydroxyl group [polymer (a-2)]

A solution of an acrylic polymer having a final conversion of 95% (hereinafter polymer (a-2)) was prepared in the same manner as in Preparation Example 1 with the exception of changing only the monomer composition as follows.

| Methanol half ester of maleic anhydride | 288 parts (20%) |
|---|---|
| 2-Hydroxyethyl acrylate | 230 parts (16%) |
| n-Butyl acrylate | 634 parts (44%) |
| Styrene | 288 parts (20%) |
| p-Tert-butylperoxy-2-ethyl hexanoate | 72 parts |

The polymer solution had a polymer solid content of 55% and a Gardner viscosity (25° C.) of O. The obtained polymer had a number average molecular weight of 3,500, an acid value of 86 mg KOH/g and a hydroxyl value of 78 mg KOH/g.

Comparative Preparation Example 1

Preparation of a vinyl polymer having a half ester group [polymer (a-3)]

A solution of an acrylic polymer having a final conversion of 100% (hereafter polymer (a-3)) was prepared in the same manner as in Preparation Example 1 with the exception of changing only the monomer composition as follows.

| Methanol half ester of maleic anhydride | 288 parts (20%) |
|---|---|
| n-Butyl acrylate | 864 parts (60%) |
| Styrene | 288 parts (20%) |
| p-Tert-butylperoxy-2-ethyl hexanoate | 72 parts |

The polymer solution had a polymer solid content of 55% and a Gardner viscosity (25° C.) of W. The obtained polymer had a number average molecular weight of 3,500, an acid value of 86 mg KOH/g and was zero in hydroxyl value.

Comparative Preparation Example 2

Preparation of a vinyl polymer having a carboxyl group and a primary hydroxyl group [polymer (a-4)]

A solution of an acrylic polymer having a final conversion of 100% (hereinafter polymer (a-4)) was prepared in the same manner as in Preparation Example 1 with the excepting of changing only the monomer composition as follows.

| Methacrylic acid | 173 parts (13%) |
|---|---|
| 4-Hydroxy n-butyl acrylate | 288 parts (20%) |
| n-Butyl acrylate | 677 parts (47%) |
| Styrene | 288 parts (20%) |
| p-Tert-butylperoxy-2-ethyl hexanoate | 72 parts |

The polymer solution had a polymer solid content of 55% and a Gardner viscosity (25° C.) of R. The obtained polymer had a number average molecular weight of 4,000, an acid value of 86 mg KOH/g and a hydroxyl value of 78 mg KOH/g.

PREPARATION EXAMPLE 3

Preparation of a vinyl polymer having an epoxy group and a primary hydroxyl group [polymer (b-1)]

A 5-liter glass flask equipped with a stirrer, thermometer and condenser was charged with 580 parts of xylene and 250 parts of n-butanol. The mixture was heated to 125° C. by an electrothermic mantle. At the same temperature, a mixture of the following composition was added dropwise uniformly over a period of 4 hours. Azobisisobutyronitrile is a polymerization initiator.

| Glycidyl methacrylate | 432 parts (30%) |
|---|---|
| 4-Hydroxy n-butyl acrylate | 288 parts (20%) |
| n-Butyl acrylate | 432 parts (30%) |
| Styrene | 288 parts (20%) |
| Azobisisobutyronitrile | 72 parts |

The mixture was aged for 30 minutes. Added dropwise was a mixture of 90 parts of xylene, 40 parts of n-butanol and 14.4 parts of azobisisobutyronitrile over a period of 2 hours. The mixture was aged for 2 hours, giving a solution of an acrylic polymer having a final conversion of 100% (hereinafter polymer (b-1)).

The polymer solution had a polymer solid content of 60% and a Gardner viscosity (25° C.) of S. The obtained polymer had a number average molecular weight of 3,000, an epoxy content of 2.12 mmol/g and a hydroxyl value of 78 mg KOH/g.

Comparative Preparation Example 3

Preparation of a vinyl polymer having an epoxy group [polymer (b-2)]

A solution of an acrylic polymer having a final conversion of 100% (hereinafter polymer (b-2)) was prepared in the same manner as in Preparation Example 3 with the exception of changing only the monomer composition as follows.

| Glycidyl methacrylate | 432 parts (30%) |
|---|---|
| n-Butyl acrylate | 720 parts (50%) |
| Styrene | 288 parts (20%) |

The polymer solution had a polymer solid content of 60% and a Gardner viscosity (25° C.) of Q. The obtained polymer had a number average molecular weight of 3,000 and an epoxy content of 2.12 mmol/g and was zero in hydroxyl value.

PREPARATION EXAMPLE 4

Preparation of a vinyl polymer having an ethoxysilyl group and a secondary hydroxyl group [polymer (c-1)]

A solution of an acrylic polymer having a final conversion of 99% (hereinafter polymer (c-1)) was prepared in the same manner as in Preparation Example 3 with the exception of changing the monomer composition as follows.

| γ-Methacryloxypropyltriethoxysilane | 288 parts (20%) |
| 2-Hydroxy n-propyl acrylate | 288 parts (20%) |
| n-Butyl mathacrylate | 576 parts (40%) |
| Styrene | 288 parts (20%) |

The obtained polymer solution had a polymer solid content of 60% and a Gardner viscosity (25° C.) of U. The obtained polymer had a number average molecular weight of 4,000 and a hydroxyl value of 86 mg KOH/g.

Comparative Preparation Example 4
Preparation of a vinyl polymer having an ethoxysilyl group and a primary hydroxyl group [polymer (c-2)]

A solution of an acrylic polymer having a final conversion of 100% (hereinafter polymer (c-2)) was prepared in the same manner as in Preparation Example 3 with the exception of changing the monomer composition as follows.

| γ-Methacryloxypropyltriethoxysilane | 288 parts (20%) |
| 4-Hydroxy n-butyl acrylate | 288 parts (20%) |
| n-Butyl methacrylate | 576 parts (40%) |
| Styrene | 288 parts (20%) |

The obtained polymer solution had a polymer solid content of 60% and a Gardner viscosity (25° C.) of Q. The obtained polymer had a number average molecular weight of 2,500 and a hydroxyl value of 78 mg KOH/g.

Comparative Preparation Example 5
Preparation of a vinyl polymer having a methoxysilyl group and a secondary hydroxyl group [polymer (c-3)]

A solution of an acrylic polymer having a final conversion of 100% (hereinafter polymer (c-3)) was prepared in the same manner as in Preparation Example 3 with the exception of changing the monomer composition as follows.

| γ-Methacryloxypropyltrimethoxysilane | 288 parts (20%) |
| 2-Hydrxy n-propyl acrylate | 288 parts (20%) |
| n-Butyl methacrylate | 576 parts (40%) |
| Styrene | 288 parts (20%) |

The obtained polymer solution had a polymer solid content of 60% and a Gardner viscosity (25° C.) of Z. The obtained polymer had a number average molecular weight of 42,000 and an hydroxyl value of 86 mg KOH/g.

Comparative Preparation Example 6
Preparation of a vinyl polymer having an ethoxysilyl group [polymer (c-4)]

A solution of an acrylic polymer having a final conversion of 100% (hereinafter polymer (c-4)) was prepared in the same manner as in Preparation Example 3 with the exception of changing the monomer composition as follows.

| γ-Methacryloxypropyltriethoxysilane | 288 parts (20%) |
| n-Butyl methacrylate | 864 parts (60%) |
| Styrene | 288 parts (20%) |

The obtained polymer solution had a polymer solid content of 60% and a Gardner viscosity (25° C.) of S. The obtained polymer had a number average molecular weight of 3,000 and was zero in hydroxyl value.

PREPARATION EXAMPLE 5
Preparation of an organic solvent colored base coat composition (Y-1)

A mixture of the following components was adjusted to a viscosity of 13 seconds (Ford cup #4/20° C.) using a solvent mixture comprising 30 parts of toluene, 20 parts of isobutyl alcohol, 30 parts of cellosolve acetate and 20 parts of SWASOL 1000 (trademark, product of Cosmo Oil Co., Ltd., hydrocarbon solvent), whereby an organic solvent coating composition (Y-1) was obtained.

| 50% Acrylic resin (*1) | 110 parts |
| 88% "CYMEL 370" (*2) | 28 parts |
| 20% CAB solution (*3) | 100 parts |
| Aluminum paste (4*) | 20 parts |

Note
*1: 50% Acrylic resin prepared by polymerizing 30 parts of methyl methacrylate, 59 parts of ethyl acrylate, 10 parts of 2-hydroxyethyl acrylate and 1 part of acrylic acid in a xylene/n-butanol (70/30 by weight ratio) solvent mixture at 100° C., the resin having a weight average molecular weight of 25,000 and a solid content of 50%.
*2: 88% "CYMEL 370", trademark, product of Mitsui Cyanamide Co., Ltd., melamine resin having a resin solid content of 88% in isopropanol
*3: 20% CAB solution, a 20% solution of cellulose acetate butyrate in a toluene/n-butyl acetate (50/50 weight ratio) solvent mixture
*4: Aluminum paste: product of Toyo Aluminum Co., Ltd., tradename "Aluminum Paste #55-519", metallic pigment PREPARATION EXAMPLE 6
Preparation of an aqueous colored base coat composition (M-1)
(1) Preparation of an aqueous dispersion of acrylic resin (W-1)

A reactor was charged with 140 parts of deionized water, 2.5 parts of 30% "Newcol 707SF" (trademark, product of Nihon Nyukazai Co., Ltd., surfactant) and 1 part of a monomer mixture (1) of the following composition. The mixture was stirred in a nitrogen stream. An emulsion of 79 parts of a monomer mixture (1), 4 parts of 3% aqueous ammonium persulfate and 42 parts of deionized water was placed dropwise into the reactor over a period of 4 hours using a quantitative pump. After the addition, the mixture was aged for 1 hour.

| Monomer mixture (1) | |
| --- | --- |
| Methyl methacrylate | 55 parts |
| Styrene | 10 parts |
| n-Butyl acrylate | 9 parts |
| 2-Hydroxyethyl acrylate | 5 parts |
| Methacrylic acid | 1 part |

Then, 20.5 parts of a monomer mixture (2) of the following composition and 4 parts of 3% aqueous ammonium persulfate were concurrently placed dropwise into the reactor over a period of 1.5 hours. After the addition, the mixture was aged for 1 hour and filtered at 30° C. through a 200-mesh nylon cloth filter. Deionized water was added after which the mixture was adjusted to a pH 7.5 with dimethylaminoethanol, giving an aqueous dispersion of acrylic resin having a nonvolatile content of 20% (W-1). The resin had an average particle size of 0.1 μm and a glass transition temperature (Tg) of 46° C.

| Monomer mixture (2) | |
|---|---|
| Methyl methacrylate | 5 parts |
| n-Butyl acrylate | 7 parts |
| 2-Ethylhexyl acrylate | 5 parts |
| Methacrylic acid | 3 parts |
| 30% "Newcol 707SF" | 0.5 part |

(2) Preparation of an aqueous solution of acrylic resin (W-2)

A reactor was charged with 60 parts of butyl cellosolve and 15 parts of isobutyl alcohol. The mixture was heated to 115° C. in a nitrogen stream. At a temperature of 115° C., there was added a mixture of 26 parts of n-butyl acrylate, 47 parts of methyl methacrylate, 10 parts of styrene, 10 parts of 2-hydroxyethyl methacrylate, 6 parts of acrylic acid and 1 part of azobisisobutyronitrile over a period of 3 hours. After the addition, the mixture was aged at 115° C. for 30 minutes. A mixture of 1 part of azobisisobutyronitrile and 115 parts of butyl cellosolve was added dropwise over a period of 1 hour, followed by aging for 30 minutes. The mixture was filtered at 50° C. through a 200-mesh nylon cloth filter. The obtained reaction product had an acid value of 48 mg KOH/g, a Gardner viscosity (25° C.) of Z4, a nonvolatile content of 55% and a Tg of 45° C. The product was subjected to equivalent neutralization using dimethylaminoethanol and deionized water was added, giving an aqueous solution of acrylic resin having a nonvolatile content of 50% (W-2).

(3) Preparation of an aqueous colored base coat composition (M-1)

| | |
|---|---|
| Aqueous dispersion of acrylic resin (W-1) | 275 parts |
| Aqueous solution of acrylic resin (W-2) | 40 parts |
| "CYMEL 350" (trademark, product of Mitsui Toatsu Chemicals Inc., melamine resin) | 25 parts |
| "ALUMINUM PASTE AW-500B" (trademark, product of Asahi Chemical Metals Co., Ltd., metallic pigment) | 20 parts |
| Butyl cellosolve | 20 parts |
| Deionized water | 253 parts |

A mixture of the above components was adjusted to a viscosity to 3,000 cps with "THIXOL K-130B" (trademark, product of Kyoeisha Yushi Kagaku Kogyo KK, thickener) using a B-type viscometer (rotor revolution speed 6 rpm), giving an aqueous metallic coating composition having a nonvolatile content of about 19% (M-1).

Examples 1–2 and Comparative Examples 1–6

A solution of mixed resins having the composition (on solid basis) shown in Table 1 was prepared. Added were 2 parts of a mixture of tetrabutylammonium bromide and monobutyl phosphate in equivalent amount, 1 part of "TINUVIN 900", (trademark, product of Ciba-Geigy, ultraviolet absorber) and 0.1 part of "BYK-300" (product of BYK-Chemie Co., surface modifier). The mixture was diluted with "SWASOL 1000" (trademark, product of Cosmo Oil Co., Ltd., hydrocarbon solvent) for adjustment to a viscosity of 25 seconds (Ford cup #4/20° C.), whereby the composition of the present invention or a comparative resin composition was prepared.

The compositions thus obtained were tested for storage stability by the following method.

Storage stability: Each composition was diluted with "SWASOL 1000" to a viscosity of 30 seconds (Ford cup #4/20° C.). A 300 g portion of the diluted composition was placed into a beaker which was then temporarily covered with aluminum foil. The composition was stored at 40° C. for 2 weeks, and its viscosity (Ford cup #4/20° C.) was measured to check the degree of thickening. The results were evaluated by the following criteria: A; viscosity of not longer than 50 seconds (good storage stability), B; viscosity of not longer than 70 seconds (slightly lower storage stability), and C; viscosity of not shorter than 70 seconds (poor storage stability).

The results are shown in Table 1.

TABLE 1

| | Example | | Comparative Example | | | | | |
|---|---|---|---|---|---|---|---|---|
| Component | 1 | 2 | 1 | 2 | 3 | 4 | 5 | 6 |
| Polymer (a) | | | | | | | | |
| a-1 | 50 | | | | 50 | 50 | 50 | 50 |
| a-2 | | 50 | | | | | | |
| a-3 (Comparison) | | | 50 | | | | | |
| a-4 (Comparison) | | | | 50 | | | | |
| Polymer (b) | | | | | | | | |
| b-1 | 50 | 50 | 50 | 50 | | 50 | 50 | 50 |
| b-2 (Comparison) | | | | | 50 | | | |
| Polymer (c) | | | | | | | | |
| c-1 | 43 | 43 | 43 | 43 | 43 | | | |
| c-2 (Comparison) | | | | | | 43 | | |
| c-3 (Comparison) | | | | | | | 43 | |
| c-4 (Comparison) | | | | | | | | 43 |
| storage stability | A | A | A | B | A | B | C | A |

In Table 1, the hydroxyl value (a total of hydroxyl values in the polymers (a) and (b) based on primary hydroxyl groups) was 78 mg KOH/g in any of Examples 1 and 2 and Comparative Examples 2, 4, 5 and 6, and was 39 mg KOH/g in any of Comparative Examples 1 and 3.

In Table 1, a ratio of the polymer (a) to the polymer (b) (calculated in terms of an equivalent ratio of the carboxyl group in the former to the epoxy group in the latter) was 42:58 in any of Examples and Comparative Examples.

Examples 3–6 and Comparative Examples 7–12

Top coats were formed by the following method according to 2-coat 1-bake system using as-clear top coat compositions the resin compositions obtained in Examples 1 to 2 and Comparative Examples 1 to 6.

A dull steel panel of 0.8 mm thickness treated by chemical conversion with zinc phosphate was coated with an epoxy-based cationic electrodepositable coating composition to give a coating film of 20 μm thickness (when dried). The coated panel was baked at 170° C. for 20 minutes, polished with sand paper (# 400), and degreased by wiping with petroleum benzine. The coated panel was further coated by air spray coating with an automotive intercoating surfacer to give a coating film of about 25 μm thickness (when dried). The coated panel was baked at 140° C. for 30 minutes, subjected to wet rubbing with sand paper (# 400), dehydrated for drying, and degreased by wiping with petroleum benzine, giving a test substrate.

The metallic base coat compositions (Y-1) and (M-1) obtained in Preparation Examples 5 and 6 were applied to the test substrate to a thickness of 20 μm (when cured). The coated substrate was left to stand at room temperature for 5 minutes in the case of application of the coating composition (Y-1) and was force-dried at 80° C. for 10 minutes in the case of application of the coating composition (M-1). Each clear top coat composition prepared above was applied to the coated test substrate to give a coating film of 40 μm thickness (when cured). The coated panel was heated to 140° C. for 30 minutes, whereby the two-layer coating was cured to form a top coat.

The top coats thus formed were tested for properties as follows.

Film appearance

The metallic effect (brilliancy, whiteness and the like) was visually evaluated on A to C scale: A; excellent in metallic effect, B; poor in metallic effect, and C; exceedingly poor in metallic effect.

Acid resistance

A half area of the coated panel was immersed in a 40% solution of sulfuric acid. The coated panel was left to stand at 50° C. for 5 hours, followed by washing with water. The surface of coated panel was visually inspected and rated on A to C scale: A; no change, B; substantially no change in coating surface but a slight difference in film thickness at a boundary between the immersed portion and non-immersed portion, and C; blushing was detected.

Scratch resistance

An automobile with a coated panel attached to the roof was washed 15 times by a car washer and the surface of coated panel was visually inspected. The car washer used was a product of Yasui Sangyo Co., Ltd. available under the tradename "PO 20F WRC" and the results were evaluated on A to C scale: A; substantially no mar found by visual inspection, B; slightly marred but to a negligible extent, and C; marked mars visually detected.

Impact resistance

The coated panel was tested with a Du Pont impact tester using a weight of 500 g with a tip 0.5 inch in radius. The results were rated in terms of the maximum height (5 cm calibration) at which no cracking was caused by the weight dropped onto the coated panel.

Water resistance

The coated panel was dipped in warm water at 40° C. for 240 hours and washed with water, followed by visual inspection of the coating surface. The evaluation was made on A to C scale: A; no change, B; slight fog on the coating surface, and C; blushing on the coating surface.

Recoat adhesion

The applied base coat composition and clear coat composition were baked at 140° C. for 30 minutes to make a first top coat. Then the same base coat composition and clear coat composition were applied in the same manner to the coated panel. Thereafter the coated panel was baked at 120° C. for 30 minutes to make a second top coat. The coated panel was cut crosswise to the substrate to give 100 squares with a spacing of 1 mm. A cellophane tape was applied to and peeled from the cut surface and the adhesion between the first and the second top coats was rated on A to C scale: A; no peeling, B; slightly peeled and C; considerably peeled.

The results are shown in Table 2.

TABLE 2

|  | Example | | | |
|---|---|---|---|---|
|  | 3 | 4 | 5 | 6 |
| Base coat composition | Y-1 | Y-1 | M-1 | M-1 |
| Clear coat composition | Example 1 | Example 2 | Example 1 | Example 2 |
| Film appearance | A | A | A | A |

TABLE 2-continued

| Acid resistance | A | A | A | A |
|---|---|---|---|---|
| Scratch resistance | A | A | A | A |
| Impact resistance | 50 | 50 | 50 | 50 |
| Water resistance | A | A | A | A |
| Recoat adhesion | A | A | A | A |

|  | Comparative Example | | | | | |
|---|---|---|---|---|---|---|
|  | 7 | 8 | 9 | 10 | 11 | 12 |
| Base coat composition | Y-1 | Y-1 | Y-1 | Y-1 | Y-1 | Y-1 |
| Clear coat composition | Com. Ex. 1 | Com. Ex. 2 | Com. Ex. 3 | Com. Ex. 4 | Com. Ex. 5 | Com. Ex. 6 |
| Film appearance | A | A | A | A | C | A |
| Acid resistance | A | B | B | A | A | B |
| Scratch resistance | C | C | C | A | A | A |
| Impact resistance | 40 | 40 | 30 | 50 | 45 | 40 |
| Water resistance | B | B | B | A | A | B |
| Recoat adhesion | B | B | B | C | A | C |

What is claimed is:

1. A curable composition comprising:
   (a) a vinyl polymer having, in one molecule, (i) a group formed by half esterification of a carboxylic acid anhydride group and (ii) a primary hydroxyl group,
   (b) a vinyl polymer having an epoxy group and a primary hydroxyl group in one molecule, and
   (c) an acrylic polymer having an ethoxysilyl group and a secondary hydroxyl group in one molecule, a hydroxyl value of 10 to 250 mg KOH/g and a number average molecular weight of 2,000 to 15,000,
   wherein the proportions of the polymers (a) and (b) are such that an equivalent ratio of the carboxyl group in the polymer (a) to the epoxy group in the polymer (b) is from 1:0.5 to 0.5:1 and the polymer (c) is present in a proportion of 25 to 65 parts by weight per 100 parts by weight of the combined amount of the polymers (a) and (b).

2. The curable coating composition according to claim 1 wherein the polymer (a) has an acid value of 50 to 240 mg KOH/g, and a hydroxyl value of 5 to 150 mg KOH/g.

3. The curable coating composition according to claim 1 wherein the polymer (a) is an acrylic polymer having a number average molecular weight of 2,000 to 8,000.

4. The curable coating composition according to claim 1 wherein the polymer (b) has an epoxy content of 0.8 to 3.2 mmol/g, and a hydroxyl value of 5 to 150 mg KOH/g.

5. The curable coating composition according to claim 1 wherein the polymer (b) is an acrylic polymer having a number average molecular weight of 2,000 to 15,000.

6. The curable coating composition according to claim 1 wherein a hydroxyl value in terms of a total of hydroxyl values in the polymers (a) and (b) based on the primary hydroxyl group is 10 to 150 mg KOH/g.

7. A method of forming a top coat, the method comprising the steps of coating a substrate with a colored base coat composition and coating the base coat with a clear top coat composition, the method being characterized in that at least one of the colored base coat composition and the clear top coat composition contains as a resin component a curable composition comprising:
   (a) a vinyl polymer having, in one molecule, (i) a group formed by half esterification of a carboxylic acid anhydride group and (ii) a primary hydroxyl group,
   (b) a vinyl polymer having an epoxy group and a primary hydroxyl group in one molecule, and (c) an acrylic polymer having an ethoxysilyl group and a secondary hydroxyl group in one molecule, a hydroxyl value of 10 to 250 mg KOH/g and a number average molecular weight of 2,000 to 15,000.

wherein the proportions of the polymers (a) and (b) are such that an equivalent ratio of the carboxyl group in the polymer (a) to the epoxy group in the polymer (b) is from 1:0.5 to 0.5:1 and the polymer (c) is present in a proportion of 25 to 65 parts by weight per 100 parts by weight of the combined amount of the polymers (a) and (b).

8. The method according to claim 7 wherein the colored base coat composition is applied to a substrate, the clear top coat composition is applied to the base coat without curing the base coat, and the two coats are cured by heating according to 2-coat 1-bake system.

9. The method according to claim 7 wherein the clear top coat composition contains the curable composition of claim 7 as a resin component.

10. An article coated by the method according to any of claims 7 to 9.

* * * * *

UNITED STATES PATENT AND TRADEMARK OFFICE
CERTIFICATE OF CORRECTION

PATENT NO.: 5,889,115
DATED : March 30, 1999
INVENTOR(S): YABUTA et al.

It is certified that an error appears in the above-identified patent and that said Letters Patent is hereby corrected as shown below:

On the title page of the patent item [73], the assignee, "Kansai Paint Company, Ltd.," should be --Kansai Paint Company Limited--.

Signed and Sealed this

Fourteenth Day of September, 1999

Attest:

Q. TODD DICKINSON

*Attesting Officer*     *Acting Commissioner of Patents and Trademarks*